United States Patent Office 2,883,318
Patented Apr. 21, 1959

2,883,318
NEW FUNGICIDES AND PROCESS FOR THEIR PREPARATION

Johannes Bras, Schiedam, Netherlands, assignor to N. V. Fabriek Van Chemische Producten, Schiedam, Netherlands, a corporation of the Netherlands No Drawing. Application March 7, 1957
Serial No. 644,438

Claims priority, application Netherlands October 5, 1956

8 Claims. (Cl. 167—22)

It is known that dithiocarbamates, which are usually applied in the form of the water-insoluble salts of zinc, iron, and manganese, are active against various kinds of fungi (see e.g. U.S. patent specifications Nos. 1,972,961 and 2,317,765; Horsfall, Fungicides and Their Action, 1945). They are, however, only slightly active, if at all, e.g. against mildew fungi, or fungi causing smut in cereals. The latter are generally combated by disinfection of the seed corn with organic mercury compounds.

They are also inactive against the frequently occurring dermatophytes of "athlete's foot." This is often treated with undecylenic acid or its zinc salt.

Several sulphur preparations having good fungicidal properties are active against mildew fungi, but their application has to be frequently repeated and should extend over several years. Even then the attack by mildew is not arrested altogether (Phytopathologische Zeitschrift, 1952, 19, 431: 10 Jahre Versuche zur Bekämpfung des Apfelmehltaues *Podosphaera leucotricha*).

Dyes, particularly the basic ones, also have a fungicidal effect; they have been used, for example, against mildew in vines (Truffaut and Pastac: La chémothérapie des maladies des plantes par des colorants organiques, C.R. Ac. Sc., 189, 1013; Marcard: De l'emploi de certains colorants dans la lutte contre le mildiou de la vigne, Chim. et Ind., 27 (1932), 15; Meyer: Emploi des colorants et de diverses substances organiques dans la lutte contre les maladies cryptogamiques, Chim. et Ind., 28 (1932), 263). These workers came to the conclusion that the various dyes used by them showed a considerable fungicidal effect. They drew attention to a curative effect appearing side by side with the preventive effect. Some dyes, however, had too strong a phytocidal effect to be suitable. Moreover, the spraying was carried out at a very high concentration (5%), while it was imperative to add a spreader to the spraying solution, which in some cases was not possible on account of a reaction of the spreader with the dye.

Finally it is to be noted that in the French patent specification No. 948,991 the use of salts of alkylene-bis-dithiocarbamic acid as fungicides is recommended.

I have now found that new fungicides are obtained by forming salts of dithiocarbamic acid or alkylene-bis-dithiocarbamic acids with basic dyes. These products have a broad fungicidal effect ("broad spectrum"), which is demonstrated by the fact that they are, for example, active against: Venturia on apples and pears; *Podosphaera leucotricha* on apples; Oidium on begonias; Cladosporium *fulvum* on tomatoes; Fusarium and Tilletia on cereals. In view of their activity with cereals they are eminently suited as disinfectants for cereal (sowing seed), for which purpose, as has already been observed above, organic mercury compounds have been used almost exclusively hitherto. Further they are highly active against certain dermatomycetes, such as *Trichophyton purpureum* and *Trichophyton gypseum* ("athlete's foot"), for the treating of which they can be incorporated in ointments, creams or tinctures. As spraying solutions they are already active in low concentrations (0.2–0.25%). No addition of a spreader is required, because they themselves already have good wetting properties. Even in this concentration, however, probably owing to certain climatological influences, they may have too great a phytocidal effect, in consequence of which their application might cause damage to fruit-trees for example. The compounds of dithiocarbamic acid should be regarded as salts of basic dyes, which instead of the usual acid radical contain the dithiocarbamic acid and the alkylene-bis-dithiocarbamic acid radical respectively.

For the concept of "basic dyes" reference may be made, by way of example, to Bucherer, Lehrbuch der Farbenchemie, 2nd ed. (1921), page 292. Basic dyes are organic compounds in the form of salts, the chromogenic part of which is a cation, while the anion is usually an inorganic acid radical (chloride, sulphate), but may also be organic (oxalate). It is worth noting that basic dyes whose basic strength is very small do not enter into reaction with a salt of dithiocarbamic acid or of alkylene-bis-dithiocarbamic acid, or at least do not form any sufficiently stable compounds therewith.

The new compounds can be prepared by converting the dye with an alkaline metal salt (including the ammonium salt) or an alkaline earth metal salt of a dithiocarbamic acid or of an alkylene-bis-dithiocarbamic acid. They may also be prepared by reacting the dye base with carbon disulphide and an organic amine and diamine respectively. Basic dyes still containing a reactive imino or amino group can be converted with an alkali metal hydroxide or alkaline earth metal hydroxide and carbon disulphide. If in this case the dye base is the starting material, the conversion with carbon disulphide is sufficient.

The acids may be substituted by one or two organic radicals at the nitrogen atom. Suitable substituents are alkyl, e.g. methyl, ethyl; aralkyl, e.g. benzyl; aryl, e.g. phenyl, xylyl; alicyclic, e.g. cyclohexyl, or heterocyclic, e.g. morpholyl, piperidyl, radicals, such as mono- or di-alkyl radicals. If the dye base is converted with carbon disulphide and an organic amine, the latter may be an amine or a diamine respectively which contains one or two of the abovementioned radicals, such as methyl or dimethylamine, ethyl or diethylamine, benzylamine, cyclohexylamine, morpholine, piperidine.

The most suitable alkylene-bis-dithiocarbamic acid on practical grounds is the corresponding ethylene compound.

It is of course also possible to admix the substances in question with other pesticides, e.g. with other fungicides, provided the latter cannot enter into reaction with the new substances obtained according to the present process.

The following examples serve to illustrate the invention, but are not intended to be limitative.

Example I

Very finely ground auramine is mixed with water to a paste, and then an equivalent quantity of a concentrated solution of sodium, potassium or ammonium di-methyldithiocarbamate is added rapidly and with vigorous stirring. The mixture is stirred until the first resinous reaction product has become homogeneously fine.

The mixture is subsequently filtered, washed with a little water, and dried at 40 to 50° C.

The yield of powder is about 95%, calculated on the dye. The content found according to the $CS_2$ determination method of Clarke is about 75%. (This method has been described in Analytical Chemistry, 23, 1842-6, 1951.)

*Example II*

Auramine is mixed with water and precipitated in the form of its base by addition of sodium hydroxide solution. This base is filtered, washed with water until it is free from chloride, and then again mixed with a little water to a paste. To this is subsequently added, with vigorous stirring, an equivalent quantity of dimethylamine in the form of a 40% solution and an equivalent quantity plus a small excess of carbon disulphide. The mixture is stirred until it has become homogeneously fine, after which it is filtered, washed with a little water, and subsequently dried at 40 to 50° C. The yield of powder is practically the theoretical quantity; the content according to Clarke's $CS_2$ determination method is about 85%.

The dimethyldithiocarbamate of auramine is slightly soluble in water.

*Example III*

One mole of an acridine yellow ("Coriphosphin") is ground with water to a paste and rapidly mixed with an equivalent quantity plus a small excess of sodium diethyldithiocarbamate. The mixture is stirred until the reaction product has become quite solid; the latter is then filtered, washed with a little water, and dried at 40-50° C.

*Example IV*

An acridine yellow ("Coriphosphin") is mixed with water until the dye has been largely dissolved. The dye base is subsequently precipitated by addition of dilute sodium hydroxide solution. The flesh-coloured precipitate is filtered, washed with water until it is free from chloride, and the paste is mixed, with stirring, with an equivalent quantity of diethylamine. The equivalent quantity plus a small excess of carbon disulphide is then added, and the reaction product is stirred until it has become quite solid again. It is subsequently filtered, washed with a little water, and dried at 40-50° C. The dithiocarbamate formed dissolves in water with a bright yellow colour and is soluble in many organic solvents.

*Example V*

Auramine base, prepared according to Example II, is mixed, with stirring, with an equivalent quantity of diethylamine and an equivalent quantity plus a small excess of carbon disulphide until the mass has become perfectly homogeneous. The mass is filtered, washed with a little water, and dried at 40-50° C. The yield is practically the theoretical quantity, and the content according to Clarke's method is about 95%.

*Example VI*

Auramine base is treated in the same manner with benzylamine. The product is very resinous at first, but is dispersed on continued stirring.

The yield is about 80%, the content determined according to Clarke is 75%.

If provision is made for the resinous product to be also finely divided during the conversion, the content will rise and the yield will increase accordingly as well.

*Example VII*

The same procedure as in Example V is followed, but cyclohexylamine is used for the amine. The content of the product thus obtained is 82 to 83%, the yield is 85%.

*Example VIII*

The conversion of auramine base with morpholine for the amine according to the procedure of Example V proceeds quantitatively, and the content, determined according to Clarke's method, is about 100%.

*Example IX*

Auramine base is treated with piperidine and carbon disulphide in the manner described in Example V. The product thus formed has a content of 86-87%, while the yield is nearly 90%.

*Example X*

Auramine is mixed with water to a paste and stirred with an equivalent quantity of moist ammonium salt of phenylmethyldithiocarbamic acid. After conversion the product is filtered, washed with a little water, and dried at 40-50° C.

The yield amounts to 85%, and the content, determined according to Clarke, to 80%.

*Example XI*

One mole of auramine in aqueous solution is converted with half a mole of a water-soluble salt of ethylene-bis-dithiocarbamic acid, the total volume being 30 times the weight of the dye. After filtration and washing with a little water, a moist product of 2.2 times the weight of the dye is obtained, with a content of 53% according to the method of analysis of Clarke, which amounts to a yield of nearly 95%.

*Example XII*

One mole of a finely ground acridine orange ("Euchrism Oranje NO"; free from zinc chloride) is mixed, with stirring, with 1 mole of the dithiocarbamate from morpholine, carbon disulphide, and sodium hydroxide solution in a total quantity of 1000 cc. of water. When the conversion is complete, the product is filtered, and dried at 40-50° C. The yield amounts to 83 to 85%, determined according to Clarke's method. The product is fairly soluble in water, and also in organic solvents (e.g. chloroform).

*Example XIII*

Peko spring wheat was infected with spores of *Tilletia tritici* (2 grams of spores per kilogram of seed) and disinfected 2 days, 2 weeks, and 6 weeks respectively before the seed was sown out of doors. Comparative tests were performed with "Ceresan-New" (commercial product of Farbenfabriken Bayer A.G., Leverkusen, Germany, comprising as an active ingredient) methoxy ethyl mercury silicate and with auramine-dimethyldithiocarbamate (50% product) as disinfectants, referred to as C—N and ADC respectively in the heading of the table. Both substances were used in a concentration of 0.5 part by weight to 1.5 parts by weight of talc and 1 part by weight to 1 part by weight of talc respectively, and in undiluted condition; these concentrations are indicated in the table by 0.5, 1, and 2 respectively. The cases in which the infected seed was not disinfected before the sowing are to be found in the table under dose 0.

Two grams of the preparation per kilogram of seed, in dilute or undiluted condition, was taken.

In all the tests except No. 2, an equal quantity by weight of grains of wheat was sown in a row 5 meters long; next to it three rows of equal length were sown with infected seeds, which had not been disinfected. In test No. 2, however, which was moreover performed in another field, the rows had a length of 10 meters, while two rows for checking purposes were sown with infected seeds which had not been disinfected.

For each row the number of smut ears was counted. With the checking rows in test No. 1 the average of the three rows was taken, and in test No. 2 the average of the two rows.

| Time elapsed between disinfection and sowing | Dose | Number of smut ears | |
|---|---|---|---|
| | | C-N | ADC |
| (1) 2 days | 0 | 138 | 138 |
| | 0.5 | 34 | 23 |
| | 1 | 15 | 11 |
| | 2 | 12 | 8 |
| (2) 1 week | 0 | 222 | 222 |
| | 0.5 | 31 | 28 |
| | 1 | 12 | 12 |
| | 2 | 5 | 1 |
| (3) 2 weeks | 0 | 138 | 138 |
| | 0.5 | 25 | 11 |
| | 1 | | (¹) |
| | 2 | 5 | 3 |
| (4) 6 weeks | 0 | 138 | 138 |
| | 0.5 | 19 | 13 |
| | 1 | 15 | 1 |
| | 2 | 6 | 2 |

¹ No reliable value, probably owing to error in test.

The disinfection tests showed that auramine-dimethyl-dithiocarbamate, even when used in large excess doses, does not cause any retardation of germination or damage to wheat or rye. It has a very marked vapour effect, which may be of importance in the disinfection of seeds for killing the pathogenic germs that have penetrated more or less deeply into the seeds.

What I claim is:

1. A method for disinfecting organic materials which comprises applying to said materials a salt of a basic dye selected from the group consisting of diphenylmethane and acridine dyes and an acid selected from the group consisting of dithiocarbamic acid, its N-monosubstituted and N-disubstituted derivatives, lower alkylene bisdithiocarbamic acids and their N-substituted derivatives, the substituents at the nitrogen atoms being selected from the group consisting of alkyl, aryl, aralkyl, alicyclic and heterocyclic radicals.

2. A salt of a basic dye selected from the group consisting of diphenylmethane and acridine dyes and an acid selected from the group consisting of dithiocarbamic acid, its N-monosubstituted and N-disubstituted derivatives, lower alkylene-bis-dithiocarbamic acids and their N-substituted derivatives.

3. A salt of a basic dye selected from the group consisting of diphenylmethane and acridine dyes and an acid selected from the group consisting of dithiocarbamic acid, its N-monosubstituted and N-disubstituted derivatives, lower alkylene-bis-dithiocarbamic acids and their N-substituted derivatives, the substituents at the nitrogen atoms being selected from the group consisting of alkyl, aryl, aralkyl, alicyclic and heterocyclic radicals.

4. The salt of claim 3 wherein the basic dye is auramine.

5. The salt of claim 3 wherein the basic dye is acridine orange.

6. The salt of claim 3 wherein the basic dye is acridine yellow.

7. A salt of auramine and dimethyldithiocarbamic acid.

8. A salt of auramine and ethylene-bis-dithiocarbamic acid.

References Cited in the file of this patent

UNITED STATES PATENTS

| 1,521,739 | Weiss | Jan. 6, 1925 |
| 1,522,712 | Cadwell et al. | Jan. 13, 1925 |
| 1,972,961 | Tisdale et al. | Sept. 11, 1934 |
| 2,342,332 | Dean | Feb. 22, 1944 |

FOREIGN PATENTS

| 541,048 | Great Britain | Nov. 11, 1941 |

OTHER REFERENCES

Lynch et al.: J.A.C.S., vol. 55, 2515–20 (1933).